Sept. 12, 1961 J. R. CLARK 2,999,657
STABILIZING MEANS FOR AIRCRAFT
Filed Feb. 17, 1958 2 Sheets-Sheet 1

INVENTOR.
John R. Clark
BY
H. C. Goldwire
AGENT

Sept. 12, 1961     J. R. CLARK     2,999,657
STABILIZING MEANS FOR AIRCRAFT
Filed Feb. 17, 1958     2 Sheets-Sheet 2

INVENTOR.
John R. Clark
BY
H.C. Goldwire
AGENT

United States Patent Office 2,999,657
Patented Sept. 12, 1961

2,999,657
STABILIZING MEANS FOR AIRCRAFT
John R. Clark, Dallas, Tex., assignor to Chance Vought Corporation, a corporation of Delaware
Filed Feb. 17, 1958, Ser. No. 715,541
2 Claims. (Cl. 244—91)

This invention relates to stabilizing means for aircraft, and more particularly to a device for providing added directional stability in an aircraft during flight at supersonic speeds.

Because of their large areas forward of the aircraft center of gravity, the long, slender fuselages of modern high-performance aircraft have a destabilizing effect which is to a large degree independent of the Mach number of flight. Meanwhile, at supersonic speeds, the contribution to directional stability provided by a fixed vertical stabilizer, dorsally mounted for ground clearance and for other compelling reasons, tends during flight in the supersonic regime to decrease with increase in Mach number. Thus, since net stability of the aircraft is the sum of the stabilizing effects of the vertical stabilizer and the destabilizing effects of the fuselage, net stability at supersonic speeds steadily declines with increase in Mach number, and the relationship between the positive contribution of the vertical stabilizer on the one hand and the negative contribution of the fuselage on the other is such that directional stability eventually becomes zero. Hence, this phenomenon occasions serious design problems for aircraft intended for operation at high Mach numbers.

The stability of an aircraft during a roll is dependent in large degree on its longitudinal stability and in particular upon the directional stability contributed by its tail surfaces; and adequate stability is maintained as long as the magnitude of these contributions exceeds centrifugal and other forces tending to misalign the aircraft relative to its direction of translation at its center of gravity. Since the efficiency of the vertical stabilizing surface steadily deteriorates with increase in supersonic Mach number, however, increase in speed of flight eventually brings the aircraft into a condition wherein the stability contributed by its tail surfaces during rolls is inadequate, and roll instability imposes an unequivocal limitation on performance of the aircraft.

Among the causes of the loss in efficiency of the vertical stabilizer with increase in supersonic speed may be mentioned the vortices set up thereabout by the passage of the fuselage and wing through the air; and decrease in directional stability is much aggravated at positive angle of attack by the flow separations brought into existence over the upper surface of the wing. Even in level flight, the wing is at a positive, if small, angle of attack; hence, lack of smoothness in supersonic airflow at points adjacent and spaced outwardly from the rear portion of the fuselage is inclined to be more pronounced above rather than below the fuselage, and this effect is magnified where the wing is located relatively high on the fuselage. In addition, the canopies, etc. found on the dorsal surfaces of many aircraft add further to the airflow disturbances above the fuselage. For these reasons, smooth supersonic airflow located at reasonable distances outwardly from the fuselage may more readily be found below, rather than above, the aircraft.

When other factors remain constant, the contribution to stability afforded by a vertical surface may be increased by enlarging the area of the surface. Accordingly, dorsal fins of considerably increased area and usually displaying a large increase in extension above the fuselage have been considered and utilized on supersonic aircraft. Improvement in this direction is limited, however, by several factors. For one thing, the problem of overhead clearance quickly becomes acute when the height of the fin is increased: the dorsal fins of many carrier-based aircraft, for example, are already as high as may be tolerated by the housing and handling provisions on the aircraft carriers. Even where carrier suitability is of no concern, increases in the dimensions of the dorsal fin are limited in effectiveness by accompanying losses of fin rigidity which, because of aeroelastic effects, bring with them serious losses in efficiency of the stabilizing surface and which are always difficult, if not impossible, to correct without highly undesirable changes in the weight, thickness, etc. of the fin.

To add directional satbility, aircraft have previously been provided with fixed ventral fins which, for obvious reasons, have not extended below the no-damage ground line (particularly defined in a later paragraph). While in some cases justifiable for their favorable aerodynamic effects at subsonic speed, these fins are limited to an extension below the fuselage which is so brief that they are virtually completely immersed in disturbances such as fuselage-excited vortices at supersonic speeds and consequently are of no significant or worthwhile value in adding to the directional stability of the aircraft when flight is at supersonic speeds so high that the purely directional and/or the roll stabilities contributed by the dorsally located vertical stabilizer has fallen, relative to the negative contribution of the fuselage, etc., below a critical value. The occurrence of this condition of unsatisfactorily low net directional and/or roll stability is dependent, other factors remaining equal, upon the magnitude of the supersonic speed; and, as used herein, the term "high supersonic speed" refers consistently and only to a supersonic speed of such magnitude as to bring into being, in the absence from the aircraft of the invention herein disclosed, the condition of directional and/or roll instability set forth above. This term is not to be confused with the slightly similar term "high-"speed flight" which is employed below always in one particular meaning; i.e., any speed above the range in which the aircraft customarily operates while in its take-off configuration (landing gear extended and/or wing adapted for increased lift, etc.).

It is accordingly a major object of this invention to provide means for increasing the net directional and roll stabilities of an aircraft flying at a high supersonic speed.

Another object is to increase in striking degree the vertical surface area located rearwardly of the center of gravity and contributing to the directional and roll stabilities of an aircraft, and to accomplish this in a manner wherein the increase in area is accompanied by a decrease in the overhead clearance problem and aeroelastic problems of the aircraft.

A further object is to provide a stabilizing surface which is less subject to aerodynamic disturbances originated upstream thereof by the fuselage and wing of the aircraft and which is substantially immune to decreases in efficiency when the aircraft is flown at positive angles of attack.

Yet another object is to provide a stabilizing surface meeting the above and other objects and which provides adequate ground clearance during landing and ground operation of the aircraft.

Other objects and advantages will be apparent from the specification and claims and from the accompanying drawing which illustrates an embodiment of the invention.

It will be understood that the term "no-damage ground line" is used herein as commonly applied to an aircraft with one or more main landing gear units and a forwardly mounted nose gear unit, and that the line referred to extends from the bottom of the main landing gear, as it may be compressed, its tires inflated, etc. at landing, to a point which will first be struck if, with the main landing gear in contact with the ground, the aft end of the aircraft is so positioned as to come into ground contact. It is further to be understood that the line termed the "no-damage ground line" is considered herein to remain fixed relative to the aircraft, i.e. that, as defined, it is not altered by extension and retraction of the landing gear but remains a definite entity relative to which the positions of objects may be defined whether or not the landing gear is extended or retracted and regardless of the attitude of the aircraft.

Briefly described, the invention comprises a fin (or fins) and moving means therefor, and additionally comprises, where desired, pilot-controllable means, a yieldable means in the moving means, a bumper for preventing damage to the fin, and programming means in or associated with the moving means. The fin is ventrally mounted on the aircraft aft of the center of gravity of the latter, is movable to a first position in which it lies virtually or altogether above the no-damage ground line of the aircraft, and further is movable to a second position in which it extends well below the aircraft and the no-damage ground line. The moving means, which may be partly or altogether automatic in operation, moves the fin to its first position prior to landing of the aircraft and to its second position prior to flight at high supersonic speeds. The programming means provides control of the speed at which the fin is extended and/or retracted by the moving means. The pilot-controllable means permits the pilot to override automatically effected operations of the moving means and obtain selective movement of the fin between its first and second positions when the aircraft is adapted for high-speed flight but not when it is adapted for landing. The yieldable means operates to permit emergency movement of the fin to its first position. In the preferred embodiment, the fin is pivotable on a transverse axis, and according to one modification, it is retractable at least in part into the fuselage, while in another modification it may be telescoped into a fixed fin. It is contemplated that a pair or more of the fins, simultaneously movable by the moving means, may be employed on the aircraft.

Figure 1:
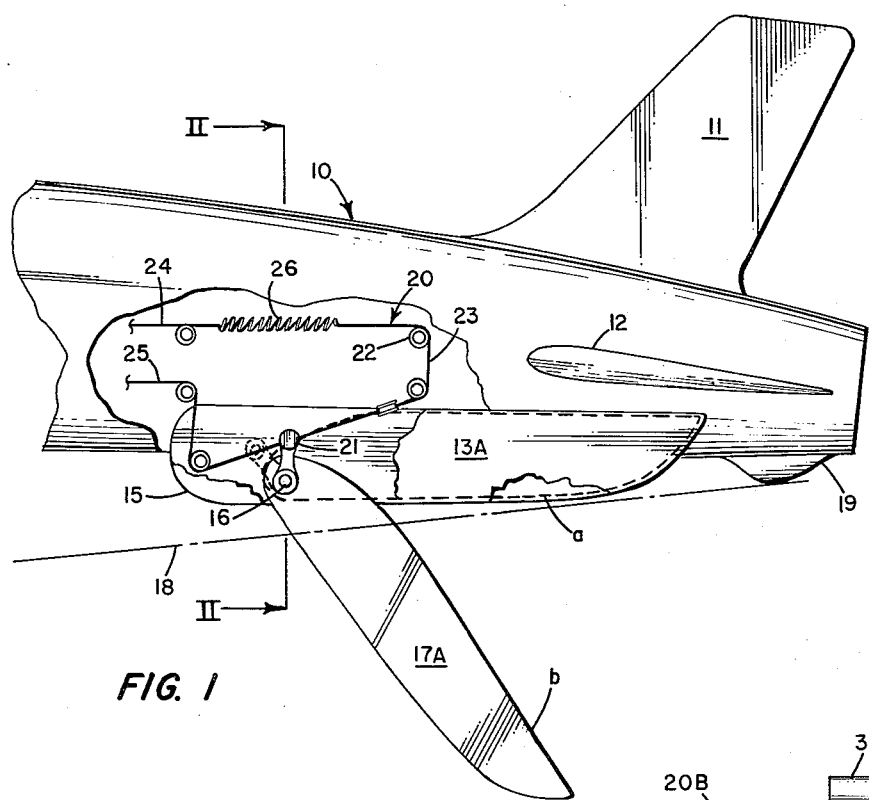
FIGURE 1 is a side view of the fuselage rear section of an aircraft utilizing a preferred form of the invention, certain areas of the skin of the fuselage and of the fixed fin of the invention being represented as cut away in order to show the moving means and, for simplicity of representation, omitting all showing of the power plant of the aircraft.
Figure 2:
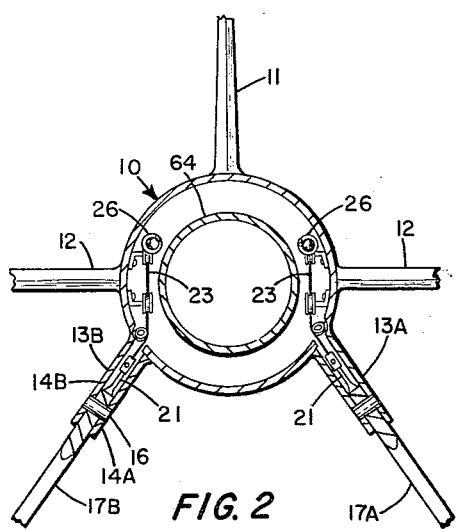
FIGURE 2 is a cross-sectional view taken as indicated by line II—II of FIGURE 1.

With reference now to FIGURES 1 and 2, an aircraft has a rear fuselage section 10 housing an engine 64 and provided with the usual dorsal fin 11 and horizontal stabilizers 12. Symmetrically mounted (i.e., equally spaced on opposite sides of the aircraft centerline) and located on a ventral surface of the fuselage 10 aft of the center of gravity (not shown) of the aircraft is a pair of fixed fins 13A, 13B. Each fixed fin, for example, the right-hand fin 13B, has longitudinally extending, spaced-apart, inboard and outboard walls 14A, 14B which converge at their forward ends to form, as seen on the left-hand fin 13A, a smoothly contoured leading edge 15. At their lower edges, the walls 14A, 14B preferably have no connection rearwardly of the general vicinity of the pivot 16 (to be described). The contour of the leading edge 15 and the spacing of the walls 14A, 14B should be such as to form an aerodynamic body of desirably low drag while concurrently providing a suitable housing for one of the two movable fins 17A, 17B to be described below. Neither of the fixed fins 13A, 13B should extend below the no-damage ground line of the aircraft, which in the example is represented by the line 18 extending from a bumper 19 mounted on the bottom of the fuselage 10 aft of the fixed fins 13A, 13B to a point with which the lower extremity of the main landing gear (not shown) coincides when the latter is extended and the aircraft landed.

The left-hand movable fin 17A, taken as typical of the two movable fins 17A, 17B, is housed in and is extendable from one of the fixed fins, namely the fixed fin 13A. Their differences in location being borne in mind, all that is said below concerning the left-hand fixed fin 13A and the corresponding movable fin 17A applies also to the right-hand fixed and movables fins 13B, 17B. Mounted on a pivot 16 extending generally transversely of the aircraft and rigidly attached at its two ends to the respective inboard and outboard walls 14A, 14B of the fixed fin 13A, the movable fin 17A is pivotable upwardly to a first position a wherein much or, as desired, all of it is housed or sheathed in the fixed fin 13A and wherein it lies above the no-damage ground line 18. Because of the restriction imposed on it by the ground line 18, which it must clear, the fixed fin 13A is of comparatively limited extension below the fuselage 10. In order that, when extended downwardly out of the fixed fin 13A, it may extend well below the fuselage 10 into smooth supersonic airflow, the movable fin 17A must be of considerable length. Thus, the movable fin 17A is made comparatively long and narrow, and it is contoured to provide an efficient stabilizing surface of preferably no lift at zero angle of attack.

The function of the moving means is to move the pivotable fins 17A, 17B of the invention to the first, raised position a prior to normal landings of the aircraft and to the second, extended position b when or before needed for flight at high supersonic speeds, the latter term always being employed herein in its one specific meaning set forth in a previous paragraph. Movement of the fins 17A, 17B to the first position a must be accomplished invariably, and preferably automatically, by the moving means before normal landings to avoid damage to the fins 17A, 17B through ground contact, and conveniently may be made to occur at the time that the aircraft is placed in its landing condition or configuration (landing gear extended, etc.). Movement of the fins 17A, 17B to their second position b may be accomplished by the moving means either automatically or under the direct control of the pilot. The moving means may comprise any desired arrangement, for example a purely mechanical linkage or a mechanism actuated hydraulically or by other means, which is compatible with accomplishment of the above-delineated functions, and description of one preferred form 20 of the moving means, as applied to the movable fins 17A, 17B of FIGURES 1 and 2, follows immediately below.

An arm 21 rigidly connected to the movable fin 17A at or near the pivot 16 extends upwardly within the fixed fin 13A. A series of pulleys 22 or equivalent are mounted in the fixed fin 13A and fuselage 10, and thereabout is passed a cable 23 having upper and lower runs 24, 25 extending forwardly through the fuselage aft section 10 toward the nose of the aircraft. The cable's lower run 25 passes by and is rigidly connected to the arm 21 at the upper end thereof. The runs 24, 25, shown as cut away in the drawing, preferably are connected to the landing gear retracting mechanism of the aircraft in such manner that extension of the landing gear moves the arm 21, through the cable 23, in a counterclockwise direction, thus automatically retracting the movable fins 17A, 17B into the fixed fins 13A, 13B, and retraction of the landing gear is accompanied by clockwise motion of the arm 21, as seen in FIGURE 1, and thus by automatic extension of the movable fins 17A, 17B. While connection of the moving means 20 to only the left-hand fin 17A has been described, it will be understood that the right-hand fin 17B also has an arm 21 and that this arm is similarly connected to a cable 23 similar and equivalent in all ways to the cable 23 described above. It also is contemplated that an auxiliary, pilot-controllable means actuatable from the cockpit and of function parallel to that of the moving means 20 shown may be provided to allow the pilot to retract the fins 17A, 17B at will during cruising flight and to extend them for high-speed supersonic flight.

The yieldable means, preferably included in or associated with the moving means 20, may take the form of a coiled spring 26 connected into each cable 23 in a location where, if a wheels-up landing should be necessary, or if the moving means 20 should fail to operate, ground contact may stretch the springs 26 and force the movable fins 17A, 17B from their second, extended position b toward or into the first, retracted position a. A breaking-link or other device which will yield upon the application of ground forces to the movable fins 17A, 17B may, of course, be employed in place of or in addition to each spring 26.

The bumper 19, rigidly mounted on the bottom of the fuselage 10 and rearwardly of the fixed fins 13A, 13B, extends downwardly to the no-damage ground line 18 and provides a mechanical barrier that prevents inadvertent contact of the fixed fins with the ground when in their first, raised position a.

Figure 3:
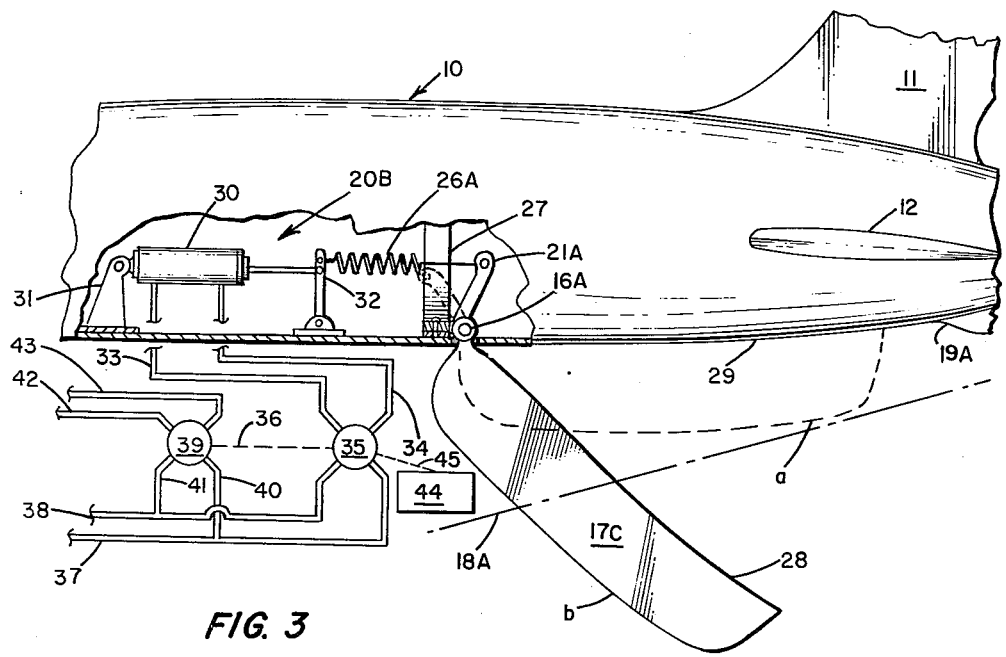
FIGURE 3 is a view similar to FIGURE 1 and showing a modified form of the invention.

In a somewhat simplified version of the invention, a single movable fin 17C, shown in FIGURE 3, is similar in form to the fins 17A, 17B shown in FIGURE 1 and is pivotally mounted at its forward end by a fitting 16A on a fixed structural member 27 of the fuselage aft section 10. The fin 17C, ventrally mounted on the fuselage 10 aft of the center of gravity of the aircraft and preferably located on the centerline of the latter, has an arm 21A which is rotated by a modification 20A (to be described) of the moving means to pivot the fin 17C on the transverse axis established by the fitting 16A between its first, retracted position A wherein an edge 28 of the fin 17C lies adjacent the ventral surface 29 of the aircraft and substantially all of the fin 17C lies above the no-damage ground line 18A and its second, extended position b wherein the edge 28 becomes a trailing edge and a major portion of the fin 17C extends below the ground line 18A. The edge 28 preferably is shaped so as to fit snugly against the ventral surface 29 when the fin 17C is in its first position a.

The moving means 20A shown in FIGURE 3 comprises a hydraulic actuator 30 pivotally mounted at one of its ends on a fixed item 31 longitudinally displaced in the fuselage 10 from the arm 21A and at its other end having connection with the arm 21A. This connection may conveniently be through a yieldable means comprising a funk spring 26A attached at one end to the actuator 30 and at the other to the arm 21A. To prevent misalignments, an idler 32 may be pivotally connected to the actuator 30 and spring 26A at the junction of the two latter items and pivotally mounted on the fuselage 10. Since such springs are well known in the art, the funk spring 26A will not be described beyond noting that it contains one or more resilient elements which allow the actuator 30 to apply sufficient force to the arm 21A to hold the fin 17C extended at all air speeds, but which yield and allow the fin 17C to pivot toward its first position a in the event that by accident or in emergency the extended fin 17C should strike the ground.

Hydraulic provisions included in the moving means include lines 33, 34 connected between the respective ends of the actuator cylinder 30 and a pilot-operated fin control valve 35. A mechanical linkage 36 is connected between the fin control valve 35 and, for example, the control valve 39 for a hydraulically energized landing gear actuator (not shown). Pressure and return lines 37, 38 from a source of hydraulic power in the aircraft are connected to the fin control valve 35 and through lines 40, 41 to the landing gear control valve 39. The linkage 36 is of such character that movement of the landing gear valve 39 to its position effecting extension of the landing gear also and invariably brings about motion of the fin valve 35 to its position wherein hydraulic pressure is applied to the actuator 30 for effecting counter-clockwise rotation of the arm 21A and retraction of the fin 17C. When the landing gear valve 39, connected to a landing gear actuator through lines 42, 43, is positioned for retracting the landing gear, the linkage 36 leaves the fin valve 35 free and subject to the will of the pilot, who may position it as desired for effecting either extension or retraction of the fin 17C.

To the arrangement described immediately above may be added programming means 44 responsive to the flight speed of the aircraft in such manner that, through a mechanical linkage 45, it automatically governs operation of the fin valve 35 for causing extension of the fin 17C at a preselected speed occurring after takeoff and prior to reaching high-speed supersonic flight, and in addition it may in similar fashion cause the fin 17C to retract upon deceleration of the aircraft to a lower speed at which the added directional stability afforded by the fin 17C while in its second, extended position b is no longer necessary. The programming means 44, in order that it may be sensitive to flight speed, may for example comprise a Mach meter (not shown).

Figure 4:
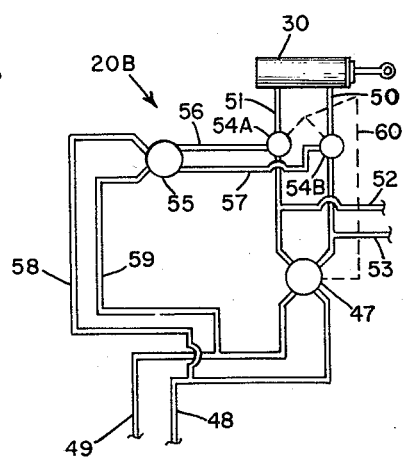
FIGURE 4 is a diagrammatic view of one form of the moving means forming a part of the invention.

FIGURE 4 shows a moving means 20B containing an alternative set of hydraulic provisions connected to the actuator 30 previously shown in FIGURE 3. A four-way valve 47 for landing gear control is connected by lines 48, 49 to the pressure and return ports of a source of hydraulic power (not shown). Lines 50, 51 lead from the landing gear valve 47 to the moving means actuator 30, and lines 52, 53 teed therefrom lead to the landing gear actuator (not shown). Connection of the lines 52, 53 to the landing gear actuator is made in such manner that directing hydraulic pressure to the line 53 causes the landing gear to extend and the fin actuator 30, hence the fin 17C, to retract; while directing pressure to the other line 52 causes the landing gear to retract and, by extending the fin actuator 30, to extend the fin 17C. Hence, the valve 47 renders the moving means 20B automatic in securing movement of the fin 17C to its second position b for supersonic speeds since the fin 17C is extended when the landing gear is retracted, and further is automatic in securing movement of the fin 17C to its first, retracted position a when the landing gear is extended prior to landing.

Where desired in order to allow the pilot to override the automatic operation of the moving means 20B just described, a pilot-controllable three-way valve 54A or 54B may be connected into each of the lines 50, 51 of the fin actuator 30, and another pilot-controllable four-way valve 55 should be provided. This latter valve 55 is connected by a line 56 to the three-way valve 54A in the "extend" line 51 of the fin actuator 30, by another line 57 to the other three-way valve 54B, and by two other lines 58, 59 to the pressure and return lines 48, 49 of the hydraulic source. A mechanical linkage 60 between the landing gear control valve 47 and three-way valves 54A, 54B ensures that the fin actuator 30A is connected to the landing gear valve 47 through the lines 50, 51 whenever the landing gear valve 47 is positioned for effecting extension of the landing gear. Thus, the pilot-controlled four-way valve 55 is inoperative at such times since, because of the action of the linkage 60, it can have no connection with the actuator 30. When the landing gear valve 47 is positioned for retraction of the landing gear, however, the linkage 60 removes the three-way valves 54A, 54B from control of the landing gear valve 47 and places them under control of the pilot; and when they are positioned to connect the fin actuator 30 to the pilot-controllable four-way valve 55, they, with the latter, serve as means for overriding automatic operation and obtaining selective movement of the fin 17C between its first and second positions a, b during times when the aircraft is adapted for high speed flight (i.e., cruising flight at speeds in excess of the range practicable in the landing configuration).

Figure 5:
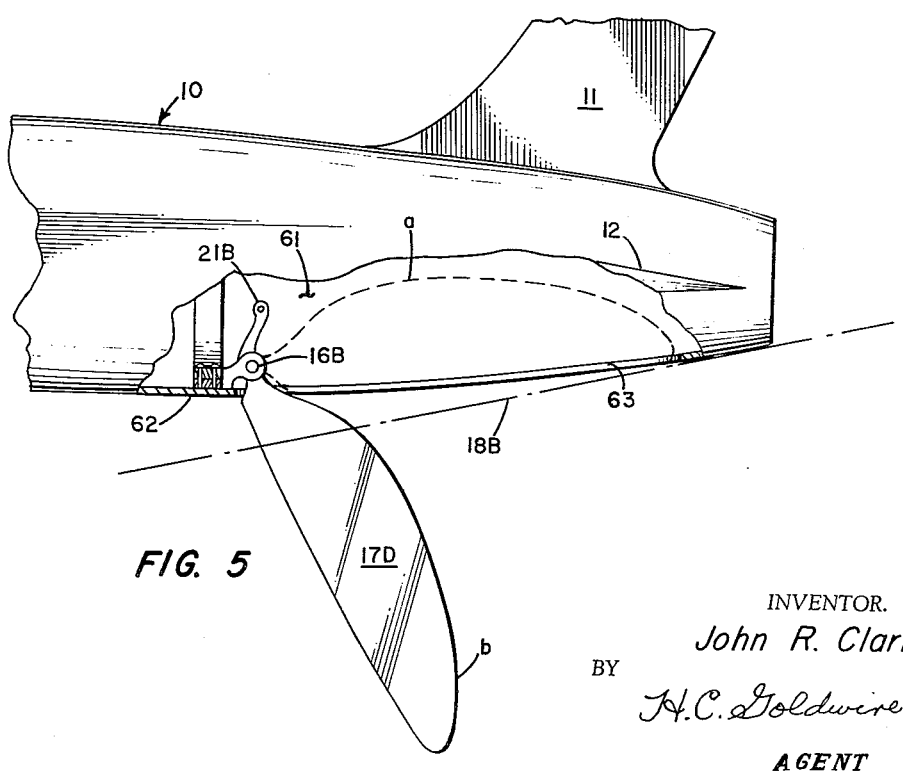
FIGURE 5 is a view similar to FIGURE 1 and showing another modification of the invention.

In a modification shown in FIGURE 5, the fuselage aft section 10 has a rearwardly located compartment 61 enclosed on its lower side by a skin 62 forming a ventral surface of the aircraft. Cut through the skin 62 on, preferably, the centerline of the fuselage 10 is a slot 63 which extends longitudinally of the fuselage and opens between the compartment 61 and the exterior of the fuselage. Pivotable on a fitting 16B about a transverse axis located aft of the center of gravity of the aircraft and near an end of the slot 63 is a movable fin 17D generally similar to the movable fins 17C and 17A, 17B previously described herein both in form and in that the fin 17D is movable between a first, retracted position a and a second position b in which it extends well below the no-damage ground line 18B of the aircraft. By way of difference from the previously described versions, the fin 17D partially (or, if desired, altogether) enters through the slot 63 into the fuselage compartment 61, where it may lie, for example, between twin engines also housed in the compartment 61 and omitted from the drawing because not essentially a part of the invention. If not retracted entirely into the fuselage 10 when in its first position a, the fin 17D should at least be raised altogether above the no-damage ground line 18B where it is safe from possible contact with the ground.

The fin 17D has an arm 21B pivotable about the transverse axis 16B or is otherwise provided with suitable means for connecting it with a moving means for effecting its positioning, any and all of the moving means 20, 20A, 20B shown in FIGURES 1–4 being applicable as desired to the fin 17D shown in FIGURE 5. It will be understood, of course, that each of the moving means 20, 20A, 20B shown and described, including the programming means 44 and the pilot-controllable means 35 and 55 are interchangeable and combinable in various ways with each other and are included herein for an example only of one preferred embodiment together with several modifications of the invention.

The operation of the movable fins 17A, 17B (FIGURE 1) and of the modifications thereof shown in FIGURES 3 and 5 will be understood from the description afforded above. In connection with each, it should be pointed out that any of the movable fins described, when employed with any of the moving means herein disclosed, and if not already retracted through action of the programming means (FIGURE 3) or pilot-controllable means (FIGURES 3, 5), is invariably and automatically pivoted about a transverse axis to its first position a wherein it lies substantially altogether above the no-damage ground line 18, 18A, or 18B of the aircraft upon adaptation of the aircraft to its landing condition or configuration. Thus, in its landing configuration, the aircraft has one or more ventrally and rearwardly located fins 17A, 17B or 17C extending toward but not below the no-damage ground line 18 or 18A if the modification shown in FIGURES 1 and 3 be employed. In the modification shown in FIGURE 5, it is intended that the chosen moving means 20, 20A, or 20B retract the fin 17D altogether into the fuselage compartment 61, or, alternatively, that, in its raised position a, the fin 17D be left extending somewhat below the fuselage 10 through the slot 63 to form, like the versions shown in FIGURES 1 and 3, a low aspect-ratio ventral fin which, though it would be of only doubtful value in contributing directional stability at high supersonic speeds, can make a positive contribution at lower and particularly at subsonic speeds since disturbance of the air flowing near the fuselage 10 is not so significant at those speeds.

At or after the time of placing the aircraft in its configuration for high-speed flight (i.e., flight at speeds above those normally encountered in the landing configuration), extension of the movable fin 17C or 17D or fins 17A, 17B is effected. If the moving means such as 20 (FIGURE 1), coordinated with the landing gear, is employed, then the movement of the fin to its second, extended position b occurs concurrently with extension of the landing gear, and the fin is already in place for contributing directional stability when the aircraft is accelerated to a high supersonic speed. In the absence of the three-way valves 54A, 54B and pilot-controllable four-way valve 55 of FIGURE 4, the same operation is obtained: the moving means automatically moves the fin to its second position b concurrently with the extension of the landing gear. With the valves 54A, 54B, and 55 added as shown in FIGURE 4, the pilot may override automatic operation of the moving means 20B and retract or extend the movable fin at will following extension of the landing gear. Without the programming means 44, the moving means 20A shown in FIGURE 3 must be operated by the pilot, after the landing gear is extended, for effecting extension and retraction of the fin; with the programming means 44 added, automatic actuation by the latter of the pilot-controllable four-way valve 35 brings about movement of the fin to its second, extended position b at a preselected speed and, where desired, its retraction to its first position a at a lower, preselected speed, such operation being of value, for instance, to reduce the unprofitable drag which would be occasioned if the fin were fully extended at a cruising speed at which its contribution to directional stability were not needed.

Each of the fins shown in the several figures of the drawing is effective in adding directional stability at high supersonic speeds because it reaches well below the aircraft into smooth supersonic airflow which, in contrast to that nearer the fuselage and especially in contrast with airflow above the fuselage, is relatively smooth and undisturbed. Because of its ventral location, airflow about the fin 17C or 17D or fins 17A, 17B does not become appreciably less smooth when the aircraft flies at high angles of attack, and because it tends to counterbalance the dorsal fin 11, the movable ventral fin 17C or 17D or fins 17A, 17B increases the roll stability of the aircraft, particularly during high-speed supersonic flight. Since the contributions to directional and roll stabilities provided by the movable fin 17C or 17D or fins 17A, 17B, when extended, are considerable, the size of the dorsal fin 11 may be much reduced, and at least two important advantages are thereby attained: the over-all height of the aircraft may be reduced; and because it becomes more rigid upon reduction in its size, the dorsal fin 11 is endowed with added efficiency.

While only one embodiment of the invention has been described herein and shown in the accompanying drawings together with several modifications thereof, it will be evident that various further modifications are possible in the arrangement and construction of the components of the stabilizing means for aircraft without departing from the scope of the invention.

I claim:

1. For providing added stability during supersonic flight of an aircraft having structure defining a no-damage ground line, a device additional to said structure and comprising, in combination with said aircraft: a symmetrically mounted pair of fixed fins placed in a rearward, ventral location on said aircraft, said fins extending from said aircraft downwardly toward and lying substantially entirely above said ground line; a movable fin positioned inside each of said fixed fins and extensible therefrom; and means for simultaneous extension of said movable fins from said fixed fins prior to high-speed supersonic flight to a position wherein they extend well below said ground line at substantially zero angle of attack and for simultaneous, automatic retraction of the same into said fixed fins and above said ground line prior to landing of said aircraft.

2. For providing added directional stability in an aircraft at supersonic speeds, a device comprising, in combination with said aircraft, the latter having structure defining a no-damage ground line: a fin of separate identity from said structure and rearwardly mounted in a ventral location on said aircraft, said fin being pivotable on an axis extending generally transversely of said aircraft between a first position wherein substantially all of said fin lies above said ground line and a second position wherein, during supersonic flight of said aircraft, a major portion of said fin extends into smooth, supersonic airflow below said ground line, there being air loads on said fin during flight which tend to move it from its second toward its first position; means moving said fin to said first position prior to normal landing of said aircraft and to said second position prior to high-speed supersonic flight, said means including an element connected between said fin and aircraft in opposition to air loads urging said fin from its second to its first position and resiliently yieldable to forces imposed by contact of said fin with a surface upon which said aircraft may land with said fin remaining in said second position

References Cited in the file of this patent

UNITED STATES PATENTS

| | | | |
|---|---|---|---|
| 336,365 | Welch | Feb. 16, | 1886 |
| 724,217 | Stokes | Mar. 31, | 1903 |
| 1,004,559 | Duncan | Oct. 3, | 1911 |
| 1,749,507 | Reynolds | Mar. 4, | 1930 |
| 2,360,116 | Elias | Oct. 10, | 1944 |
| 2,376,636 | Thompson | May 22, | 1945 |
| 2,559,827 | Northrop | July 10, | 1951 |
| 2,594,927 | Holt | Apr. 29, | 1952 |
| 2,630,985 | Sherry | Mar. 10, | 1953 |
| 2,652,812 | Fenzl | Sept. 22, | 1953 |
| 2,744,698 | Baynes | May 8, | 1956 |
| 2,924,400 | Ruget | Feb. 9, | 1960 |

FOREIGN PATENTS

| | | | |
|---|---|---|---|
| 168,951 | Switzerland | Sept. 17, | 1934 |
| 425,645 | Great Britain | Mar. 19, | 1935 |